(12) United States Patent
Tang et al.

(10) Patent No.: US 6,794,900 B2
(45) Date of Patent: *Sep. 21, 2004

(54) METHOD AND CIRCUIT FOR PRE-EMPHASIS EQUALIZATION IN HIGH SPEED DATA COMMUNICATIONS

(75) Inventors: Benjamim Tang, Hawthorne, CA (US); Richard C. Pierson, Newport Beach, CA (US)

(73) Assignee: Primarion, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/205,340

(22) Filed: Jul. 24, 2002

(65) Prior Publication Data

US 2002/0186048 A1 Dec. 12, 2002

Related U.S. Application Data

(63) Continuation of application No. 10/010,825, filed on Nov. 13, 2001, now Pat. No. 6,570,406.
(60) Provisional application No. 60/248,041, filed on Nov. 13, 2000.

(51) Int. Cl.$^7$ .......................................... H03K 19/003
(52) U.S. Cl. ............................ 326/86; 326/26; 326/27; 326/29
(58) Field of Search .............................. 326/21–23, 26, 326/27, 29, 30, 86, 87

(56) References Cited

U.S. PATENT DOCUMENTS

| 6,300,799 B1 | 10/2001 | Nakamura |
| 6,307,409 B1 | 10/2001 | Wrathall |

OTHER PUBLICATIONS

Ellersick. William et al., ISSCC 2001, Session 4, "High-Speed Digital Interfaces," 4.1, pp. 44–45 and 371, no date.
Tanahashi, Toshio et al., ISSCC 2001, Session 4, "High-Speed Digital Interfaces," 4.2, pp. 46–47, 372–374, no date.

International Search Report, issued by the European patent Office, application No. PCT/US01/47134, with International Filing Date of Nov. 13, 2001.

Dally, William J. and Paulton, John, "Transmitter Equalization For 4–GBPS Signaling," IEEE Micron Jan./Feb. 1997, pp. 48–56.

Chen, Walter Y., "A Direct Equalization Method," 1997 IEEE, pp. 2505–2508.

Tavacoli, Jim, "Challenges in Designing 10 GB/S Backplanes," IEEE.802.3ae Task Force, Jul. 2000, pp. 1–10, www.ieee802.org/3/ae/public/sep.00/tavacoli.

Ghiasi, All. "XAUI "Hari" Electrical Update II," IEEE 802.3ae, Nov. 7, 2000, www.ieee802.org/3/ae/public/nov.00.ghiasi.

Hosagrahar, Ishwar and Rogers, Shawn, "Xaui Compliance Channel Measurements," Jan. 10, 2001, www.ieee802.org/3/ae/public/jan.01/hosagrahar.

Primary Examiner—Anh Q. Tran
(74) Attorney, Agent, or Firm—Theodore E. Galanthi

(57) ABSTRACT

A method and circuit for pre-emphasis equalization of a high speed data communication system can be provided through the use of programmable pulse shaping. A data communication system configured with the pre-emphasis equalization circuit operates by receiving an input data stream and outputting a data stream for transmission through an interconnect or other transmission channel. The data can be passed through an output buffer configured with programmable pre-emphasis equalization, having input inverters at an input stage and output inverters at an output stage. During operation, once an input signal to the input stage transitions, for example from a low to a high state, an input signal to the output stage is configured to a full amplitude to drive the transmission channel. Once the output stage transitions to a full amplitude, the input of the output stage is configured closer to a mid-scale amplitude. The amount of amplitude change from full scale back to mid-scale determines the amount of equalization to be provided by the output buffer to the transmission channel.

41 Claims, 10 Drawing Sheets

METHOD AND CIRCUIT FOR PRE-EMPHASIS EQUALIZATION IN HIGH SPEED DATA COMMUNICATIONS

CROSS-REFERENCE TO RELATED APPLICATIONS

This is a continuation application that claims priority of U.S. patent application Ser. No. 10/010,825, entitled Method And Circuit For Pre-Emphasis Equalization In High Speed Data Communications, filed Nov. 13, 2001 now U.S. Pat No. 6,570,406 hereby, incorporated by reference. In addition, this application claims priority from prior U.S. Provisional Application Serial No. 60/248,041, entitled "Differential Push-Pull Output Buffer With Pre-Emphasis Equalization," filed Nov. 13, 2000, and hereby incorporated herein by reference.

FIELD OF INVENTION

The present invention generally relates to high speed data communications. More particularly, the present invention relates to method and circuit configured for providing pre-emphasis equalization during high speed data communications.

BACKGROUND OF THE INVENTION

As the speed of high performance microprocessors increases, consistent with CMOS transistor feature size reductions, the required power supply voltage continues to shrink. For example, in high speed data communications, lower power consumption is being demanded without a loss in data transmission speed. Moreover, greater flexibility and adaptability of the data communications systems to the various communication interconnects is also being demanded. FIG. 1 shows a block diagram of a typical high speed digital communication system 100, such as may be used to interconnect between integrated circuit (IC) chips across single or multiple Printed Circuit Boards (PCB), backplanes, units, and equipment racks.

Digital communication system 100 includes a transmitter 102 and receiver 104, with transmitter 102 comprising an encoder/serializer 106 and an output buffer 110, and with receiver 104 comprising an input buffer 122 and a decoder/deserializer 126. Data is typically provided to transmitter 102 by a digital subsystem in a parallel format through a data input signal 118 along with a clock input signal 120, both of which are received in encoder/serializer 106 which generates encoded data 108. While clock input signal 120 can be externally supplied, typically, timing information for clock input signal 120 must be extracted through clock recovery on receiver 104, such as from clock output signal 130.

Encoded data 108 is transmitted by output buffer 110 comprising a driver for the transmitter, which generates an output signal 112 conforming to the established signaling requirements for this interface. Output signal 112 is transmitted along a communication channel 114 comprising a transmission medium such as traces on a printer circuit board (PCB), coaxial cable or any other like means for communication links.

Receiver 104 receives a transmitted signal 116 from transmission channel 114 which is degraded due to various limitations of the transmission channel 114, including increased attenuation at high frequencies, and which are typically caused by the skin effect of copper transmission lines and various dielectric losses. For example, the skin effect of copper is the tendency of current to concentrate flow on the outer surfaces of the copper conductor, rather than the entire conductor, resulting in a higher effective resistance. Dielectric losses can occur since the dielectric within the transmission lines and PCB traces is not a perfect lossless material, e.g., at high frequencies, some energy gets dissipated in the dielectric, resulting in a degraded signal. Input buffer 122 comprises a pre-amplifier configured to receive and amplify degraded signal 116 such that an amplified signal 124 has sufficient amplitude to drive decoder/deserializer 126, which is configured to recover the data output signal 128 and clock output signal 130.

FIG. 2 illustrates timing diagrams 202 and 204 demonstrating the effect of a bandwidth limited transmission medium on the transmitted and received waveform that is realized from communication system 100. A transmitted waveform 202, such as that of output signal 112 provided to transmission channel 114, frequently uses non-return-to-zero (NRZ) signaling, which represents a logical zero by a lower value and a logical one by a higher value. Detection of the high or low value typically includes setting a threshold halfway between those two values and making a comparison of the received value against the threshold.

A received waveform 204, such as that of transmitted signal 116 from transmission channel 114, shows the effect of bandwidth limiting on transmitted waveform 202. The bandwidth limiting is due to the frequency dependent loss in the transmission medium, which is caused by factors such as the skin effect and dielectric losses discussed above. These factors typically result in losses which are relatively greater at higher frequencies, i.e., the transmitted signal gets severely attenuated at high frequencies, thus making the channel behave, in effect, like a low pass filter.

The effect of this bandwidth limiting can be seen in that waveform 204 does not reach full amplitude in a single bit period, so the value reached depends on the number of consecutive bits that are alike. For example, a lower amplitude occurs at a high peak 206, which corresponds to a high bit after a long string of low bits, whereas a high amplitude occurs at a high peak 208, which corresponds to a long string of high bits. The difference in amplitude at peaks 206 and 208 makes it difficult for receiver 104 to distinguish the logic low and high signals, i.e., the "0"s and "1"s. Similarly, low peaks 210 and 212 both correspond to logic "0", but there is a significant difference in the amplitude, depending on the string of previous bits. This effect is typically referred to as inter-symbol interference (ISI). In this manner, the maximum data rate that can be reliably transmitted in the channel 114 is very limited.

In order to address the above limitations, particularly at high frequencies, data communication systems include equalization techniques to adjust or correct the frequency characteristics of an electronic signal by restoring to the original level high frequencies of the electronic signal that have been attenuated. Equalizers can be implemented within the transmission channel, before the channel, e.g., within the transmitter, and/or after the channel, e.g., within the receiver.

FIG. 3A illustrates a block diagram showing a high speed digital communication system 300 utilizing equalization to overcome the bandwidth limitation of the transmission channel and extend the maximum rate of operation for the communication link. Similar to FIG. 1, a transmitter 302 generates a transmit signal 312. In this case, an output buffer 310 is cascaded with a transmit equalizer 313, also known as a pre-emphasis equalizer, having desirable frequency characteristics. A receiver 304 is configured to accept a degraded signal 316 similar to that of FIG. 1. Receiver 304 is cascaded with a receive equalizer 317, also known as an adaptive equalizer that adapts to the transmission channel losses. The net effect is that the combined frequency response of equalizers 313 and 317 and transmission channel 314 can be shaped to overcome the bandwidth limitation in transmission channel 314, resulting in higher overall bandwidth. In general, this shaping configuration requires equalizers 313 and 317 to provide additional gain at higher frequencies, or alternatively, to provide additional loss at lower frequencies while maintaining the high frequency gain. For the various linear buffers, amplifiers, and equalizers within communication system 300, the particular order of cascading is not important, but for practical implementations, typically one order is preferred over the other.

It is also often desirable to combine the equalization function with the buffer or amplifier function in a single element. For example, with reference to FIG. 3B, transmitter 302 can be configured with an output buffer 315 which incorporates pre-emphasis or pulse shaping equalization. Likewise, receiver 304 can be configured with an input buffer or preamplifier 323 which incorporates an equalizer filter.

The differences in performance between non-equalized and equalized transmission signals can be realized with reference to data eye diagrams of the communication systems of FIG. 1 (non-equalization) and FIG. 3(with equalization) For example, with reference to FIG. 4, the data eye of the non-equalized received signal with significant ISI is illustrated. The data eye comprises a time domain waveform showing a superposition of various transitions normalized to a multiple of the data period. FIG. 4 illustrates that both the horizontal opening, i.e., the time between zero crossing, and the vertical opening, i.e., the minimum amplitude at various time locations, are degraded due to ISI. In contrast, with reference to FIG. 5, the data eye of an appropriately equalized received signal with significantly reduced ISI is illustrated. FIG. 5 illustrates that both the horizontal opening and the vertical opening are significantly improved relative to that of FIG. 4.

As a demonstrated above, it is generally understood that output buffers of transmitters necessarily contain pre-emphasis equalization, such that a flat frequency response is obtained when the response of the buffer is combined with the response encountered in a typical electrical interconnect. Such pre-emphasis equalization is typically performed by techniques including the use of an passive analog LC filter or the use of a digital Finite Impulse Response ("FIR") filter. LC filters are generally configured with only a few inductors, typically a single inductor, due to the bulky and awkward nature of such inductors. With such a simple design, LC filters are generally used for a transmission channel of a single fixed design, i.e., of a fixed length and transmission medium.

FIR filters are more commonly used for constructing pre-emphasis equalizers, particularly since FIR filters can be programmable to adapt to various types and configurations of transmission channels. FIR filters are configured with delay lines, such as through the use of flip-flops to enable delays. FIG. 6 illustrates a typical implementation of a FIR based pre-emphasis driver or buffer 600. In this FIR equalizer 600, any serial data 602 to be transmitted along with the serial clock 604 can be provided to inputs of FIR equalizer 600. Flip-flops 606, 608, and 610 are configured to generate signals 612, 614, and 616, which are one, two, and three clock cycles, respectively, delayed from serial data 602.

Signals 602, 612, 622, and 624 are multiplied by weighting coefficients $C_0$, $C_1$, $C_2$, and $C_3$ configured within buffers 618, 620, 624, and 626, respectively, whose outputs are summed by an adder 626 generating an output signal 628. This operation results in a transfer function of the form:

$$y(n)=C0x(n)+C1x(n-1)+C2x(n-2)+C3x(n-3)$$

which is a classic finite impulse response filter. In practice, x(n) is a digital stream, so the weighting function is accomplished by varying the current or drive strength of the buffers, and the summing function is accomplished by current summing the outputs of the various stages. Such an architecture can also accommodate a varying number of additional stages, wherein the additional stages allow finer adjustment of the frequency response at a cost of additional complexity. A modified scheme to that of FIR filter 600 known as a tapped delay line (TDL) filter can include the delays being generated by fixed delays instead of flip-flops.

While the above equalization approaches can provide improved performance over non-equalized transmission techniques, these equalization approaches suffer from a variety of drawbacks, especially in very high speed applications,. i.e., in high speed digital links. For example, analog LC filters can be difficult to tune correctly, i.e., LC filters are not readily programmable, and severely limit the type of transmission channels that can be utilized. FIR filters are generally complicated and have high power requirements for operation. For high speed operation, the complexity of FIR filters limits the practical number of stages to about three, with the use of a single stage being very common. Additionally, FIR filters require a high speed clock for operation, which causes a significant amount of additional power to be dissipated in driving the additional flip-flops. about three, with the use of a single stage being very common. Additionally, FIR filters require a high speed clock for operation, which causes a significant amount of additional power to be dissipated in driving the additional flip-flops.

Accordingly, a need exists for an improved pre-emphasis equalization technique and circuit which is readily reprogrammable for various communication links, and does not have the limitations of the prior art with respect to power consumption and complexity.

SUMMARY OF THE INVENTION

The method and circuit according to the present invention addresses many of the shortcomings of the prior art. In accordance with various aspects of the present invention, a method and circuit for pre-emphasis equalization of a high speed data communication system can be provided through the use of pulse shaping. The pre-emphasis equalization method and circuit of the present invention is compatible with standard digital output buffer configurations, so that the pre-emphasis equalization method and circuit can be incorporated with little additional complexity and power dissipation as compared to a traditional digital output buffer.

A data communication system configured with the exemplary pre-emphasis equalization circuit operates by receiving an input data stream and outputting a data stream for transmission through an interconnect or other transmission channel. In accordance with an exemplary embodiment, the data can be passed through an output buffer configured with pre-emphasis equalization, having input inverters at an input stage and output inverters at an output stage.

During operation, once an input signal to the input stage transitions, for example from a low to a high state, an input signal to the output stage is configured to a full amplitude to drive the transmission channel. Once the output stage transitions to a full amplitude, the input of the output stage is configured closer to a mid-scale amplitude. The amount of amplitude change from full scale back to mid-scale determines the amount of equalization to be provided by the output buffer to the transmission channel. In accordance with various exemplary embodiments, the pre-emphasis equalization circuit can be configured with a pulse shaping circuit, such as through a feedback arrangement or with a feedforward arrangement, for facilitating the pulse shaping functions.

In an exemplary feedback configuration, the output signal from the output stage can be sensed and provided back through a feedback path to be current summed, after a slight delay, to the input signal at the output stage. In an exemplary feedforward configuration, the input signal to the input stage can be sensed and provided through a feedforward path to be current summed, after a slight delay, to the input signal at the output stage. Thus, in either a feedback or feedforward transition, the output signal at the output stage will be reduced following a slight delay after a transition from low to high. Accordingly, after a transition, a pulse shaped output waveform can be provided by the output buffer. Similar operation of exemplary pre-emphasis equalization circuit is realized for a transition from a high state to a low state.

In addition, the pulse shaping pre-emphasis equalization can be programmable, and thus selectively configured to enable one to change the amount of pulse shaping based on the length of the transmission channel to be driven.

BRIEF DESCRIPTION OF DRAWING FIGURES

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS

Figure 1:
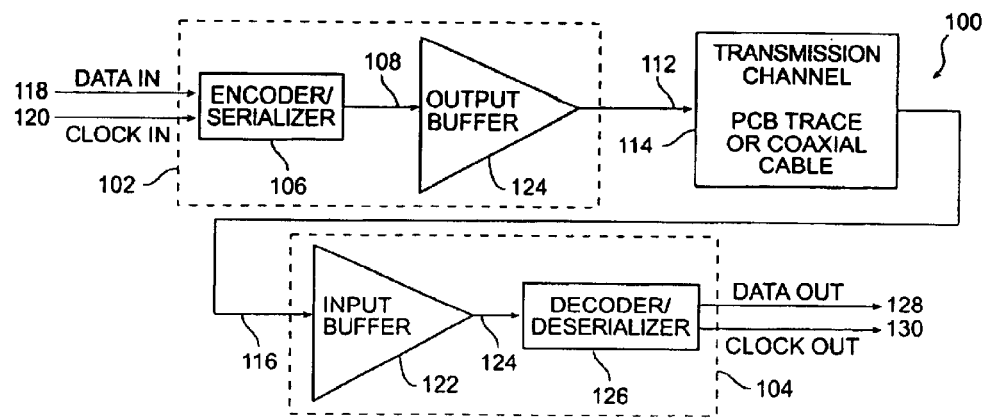
FIG. 1 illustrates a block diagram of a prior art high speed serial link.
Figure 2:
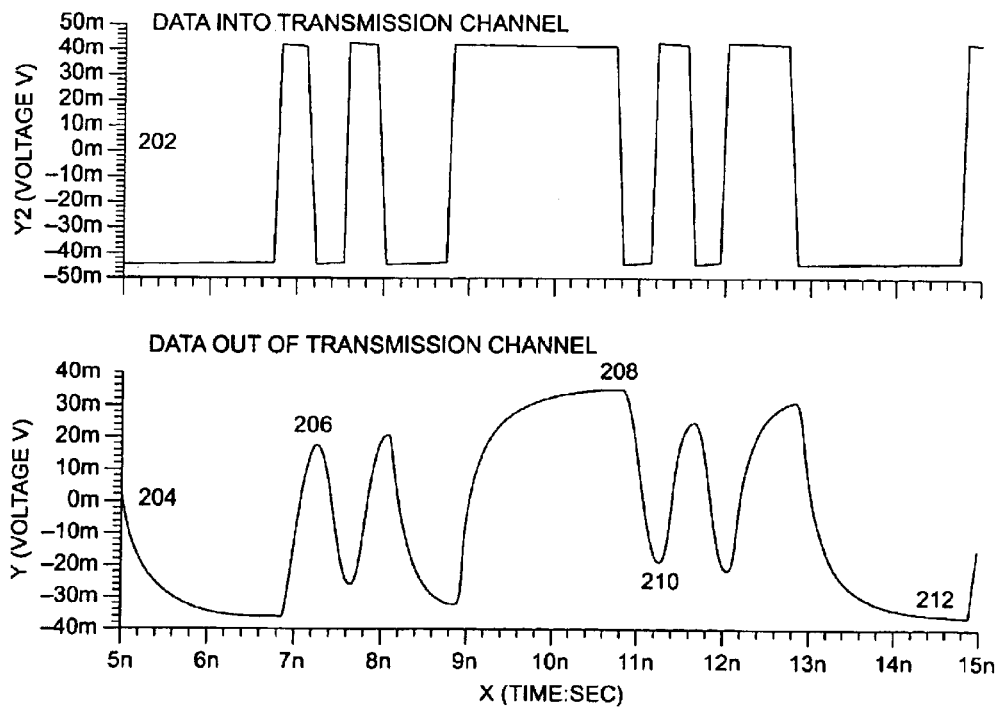
FIG. 2 illustrates the effect of the bandwidth limiting due to the copper PCB traces or coaxial cables on the signal waveform in the prior art high speed serial link of FIG. 1.
Figure 3A:
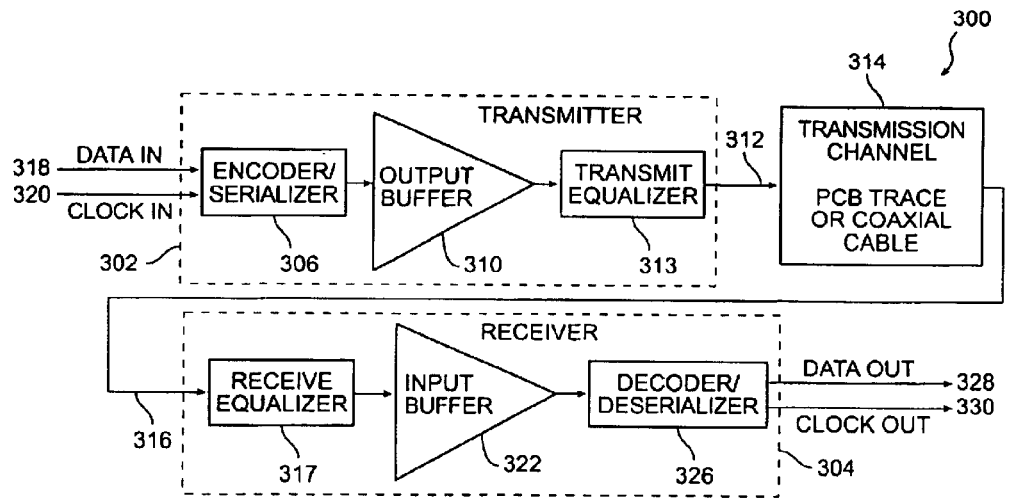
FIG. 3 illustrates a block diagram of a prior art high speed serial link employing equalization to overcome the bandwidth limiting effect of copper Printed Circuit Board (PCB) traces or coaxial cables.
Figure 3B:
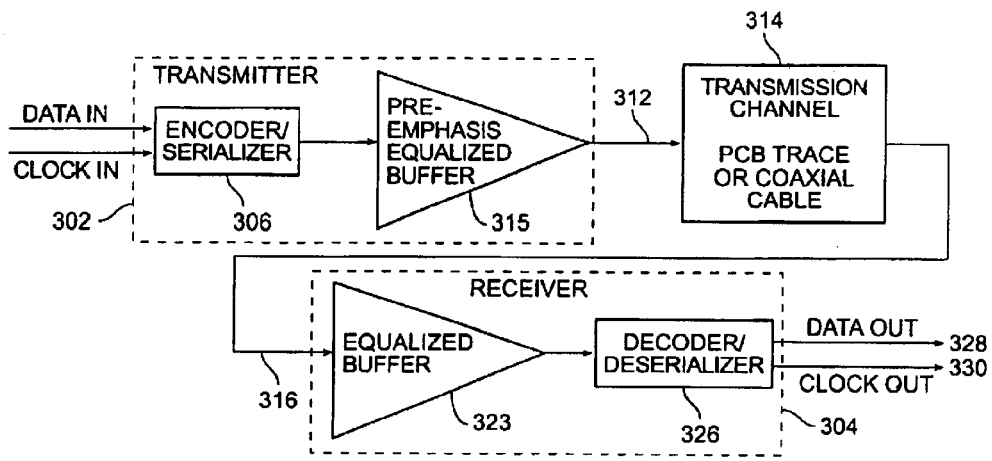
Figure 4:
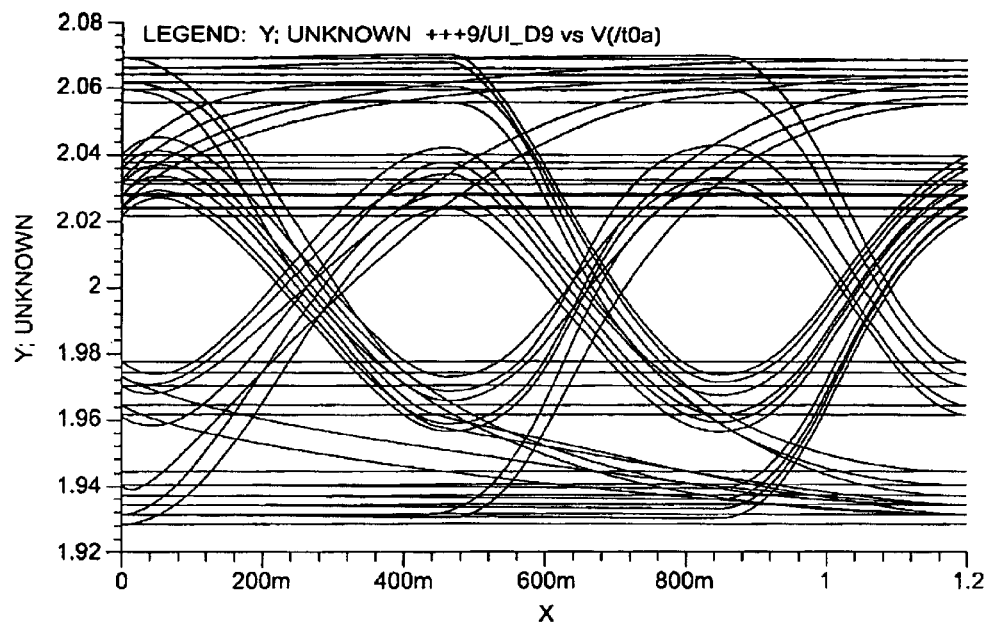
FIG. 4 illustrates a representative data eye showing a bandwidth limited signal transmitted over copper PCB traces or coaxial cables.
Figure 5:
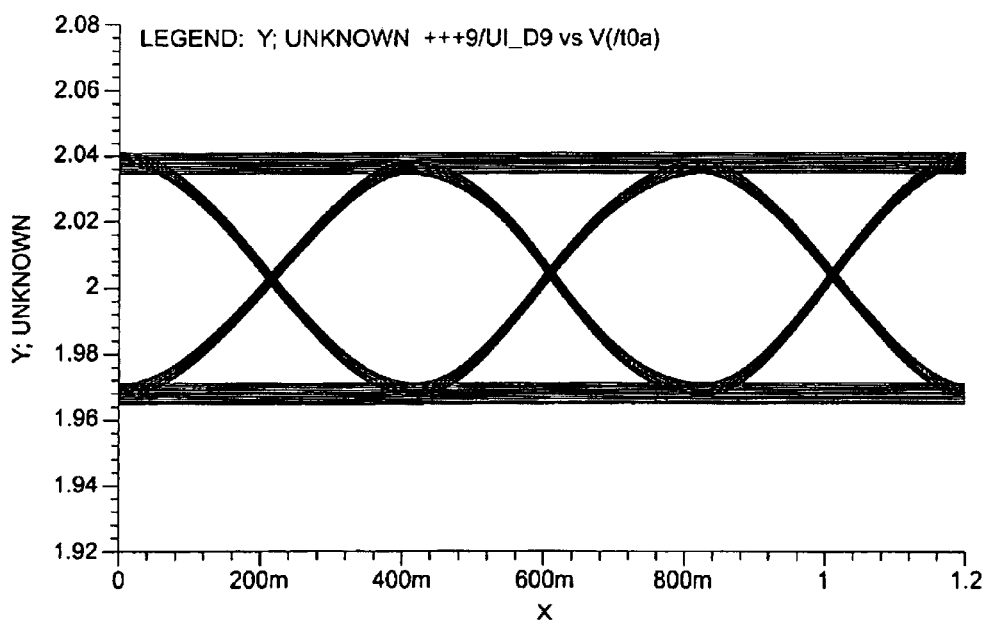
FIG. 5 illustrates a representative data eye showing the effect of equalization on a bandwidth limited signal transmitted over copper PCB traces or coaxial cables.
Figure 6:
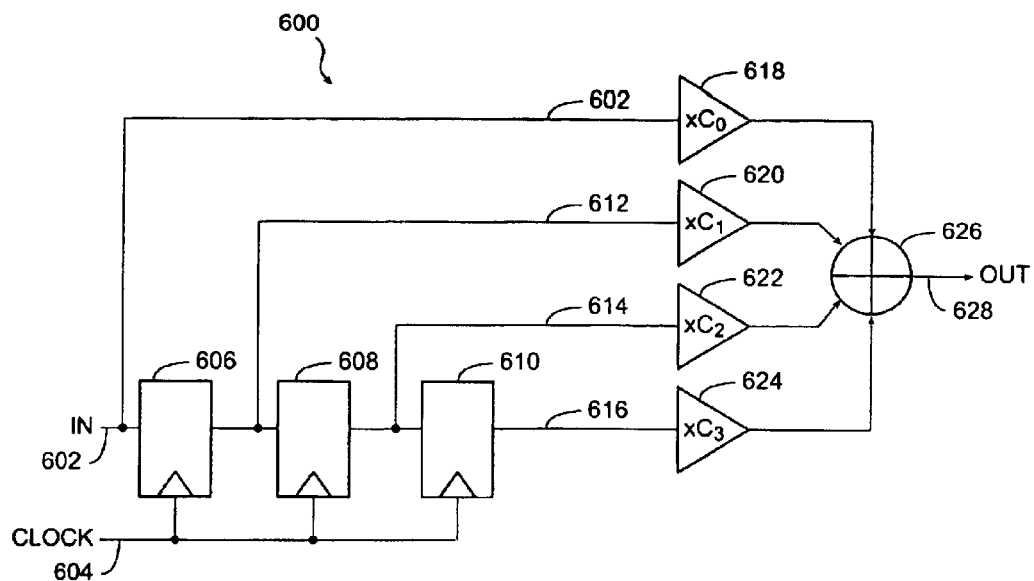
FIG. 6 illustrates a block diagram of a prior art pre-emphasis equalizer employing a finite impulse response (FIR) architecture.

The present invention may be described herein in terms of various functional components and various processing steps. It should be appreciated that such functional components may be realized by any number of hardware or structural components configured to perform the specified functions. For example, the present invention may employ various integrated components comprised of various electrical devices, e.g., resistors, transistors, capacitors, diodes and the like, whose values may be suitably configured for various intended purposes. In addition, the present invention may be practiced in any integrated circuit application where high-frequency, high speed and/or lower-voltage requirements are desired. Such general applications that may be appreciated by those skilled in the art in light of the present disclosure are not described in detail herein. However for purposes of illustration only, exemplary embodiments of an output buffer, such as a differential push-pull output buffer, will be described herein. Further, it should be noted that while various components may be suitably coupled or connected to other components within exemplary circuits, such connections and couplings can be realized by direct connection between components, or by connection through other components and devices located thereinbetween.

As discussed above, prior art equalization approaches suffer from a variety of drawbacks, especially in very high speed applications, i.e., in high speed digital links. For example, analog LC filters can be difficult to tune correctly, i.e., are not readily reprogrammable, and severely limit the type of transmission channels that can be utilized.

FIR filters are generally complicated and have high power requirements for operation.

However, in accordance with various aspects of the present invention, a method and circuit for pre-emphasis equalization of a high speed data communication system can be provided through the use of a pulse shaping circuit. The pre-emphasis equalization method and circuit of the present invention is compatible with standard digital output buffer configurations, so that the pre-emphasis equalization method and circuit can be incorporated with little additional complexity and power dissipation as compared to a traditional digital output buffer. In addition, while the exemplary pre-emphasis equalization circuit can also use analog filter techniques, the exemplary pre-emphasis equalization circuit does not require the use of bulky inductors.

A data communication system configured with the pre-emphasis equalization circuit operates by receiving an input data stream and outputting a data stream for transmission through an interconnect or other transmission channel. In accordance with an exemplary embodiment, the data can be passed through an output buffer configured with pre-emphasis equalization, having input inverters at an input stage and output inverters at an output stage.

During operation, once an input signal to the input stage transitions, for example from a low to a high state, an input signal to the output stage is configured to a full amplitude to drive the transmission channel. Once the output stage transitions to a full amplitude, the input of the output stage is configured closer to a mid-scale amplitude. The amount of amplitude change from full scale back to mid-scale determines the amount of equalization to be provided by the output buffer to the transmission channel. In accordance with various exemplary embodiments, the pre-emphasis equalization circuit can be configured with a pulse shaping circuit, such as through a feedback arrangement or with a feedforward arrangement, for facilitating the pulse shaping functions.

In an exemplary feedback configuration of the pulse shaping circuit, the output signal from the output stage can be sensed and provided back through a feedback path to be current summed, after a slight delay, to the input signal at the output stage. In an exemplary feedforward configuration, the input signal to the input stage can be sensed and provided through a feedforward path to be current summed, after a slight delay, to the input signal at the output stage. Thus, in either a feedback or feedforward transition, the output signal at the output stage will be reduced following a slight delay after a transition from low to high. Accordingly, after a transition, a pulse shaped output waveform can be provided by the output buffer. Similar operation of exemplary pre-emphasis equalization circuit is realized for a transition from a high state to a low state.

In addition, the pulse shaping can be programmable, and thus selectively configured to enable one to change the amount of pulse shaping based on the length of the transmission channel to be driven. For example, a different pulse shaping can be provided for driving 15 meters of interconnect than for driving 0.3 meter of interconnect, since a 15 meter interconnect may attenuate signals to a greater extent than would a 0.3 meter interconnect. Accordingly, the programmable pre-emphasis equalization may be configured such that the pulse shaping can be controlled, for example, through the use of variable switches, resistances, and/or through various other control input signals for suitably scaling of the amount of pulse shaping to be provided from the exemplary output buffer.

Figure 7:
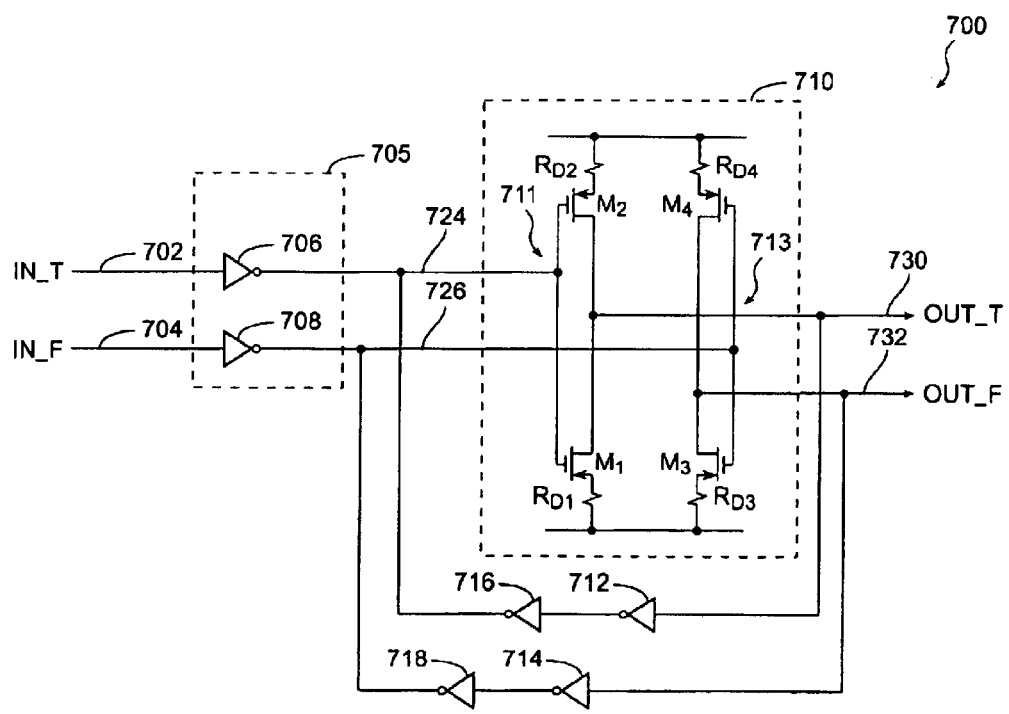
FIG. 7 illustrates a block diagram of an exemplary output buffer incorporating a pre-emphasis equalizer using a feedback architecture.

With reference to FIG. 7, a block diagram of an exemplary pre-emphasis equalizer circuit 700 in accordance with an exemplary embodiment of the present invention is illustrated. Pre-emphasis equalizer circuit 700 is configured as a differential output buffer that does not require a clock input or additional tapped delay stages, and in which pulse shaping is accomplished through the use of a feedback arrangement. Pre-emphasis equalizer circuit 700 is configured with differential input terminals 702 and 704, and suitably comprises an input stage 705 having a pair of high drive inverters 706 and 708 and an output stage 710.

A differential input signal, such as a NRZ or other data signals, can be suitably provided to input terminals 702 and 704 coupled to high drive inverters 706 and 708. High drive inverters 706 and 708 are configured to drive output stage 710, as provided through drive signals at 724 and 726. High drive inverters 706 and 708 can suitably comprise various types of inverter devices configured for driving the differential input signal to output stage 710.

Output stage 710 suitably comprises a pair of degenerated inverter devices configured for driving a differential output signal at terminals 730 and 732. In accordance with an exemplary embodiment, a pair of degenerated inverter devices 711 and 713 suitably comprises a pair of transistors $M_1$ and $M_2$ configured with degeneration resistors $R_{D1}$ and $R_{D2}$, and a pair of transistors $M_3$ and $M_4$ configured with degeneration resistors $R_{D3}$ and $RD_4$, respectively. Inverter device 711 is configured to receive drive signal 724 at the gates of transistors $M_1$ and $M_2$, with the collectors being coupled to output terminal 730, while inverter device 713 is configured to receive drive signal 726 at the gates of transistors $M_3$ and $M_4$, with the collectors being coupled to output terminal 732. Degeneration resistors $R_{D1}$, $R_{D2}$, $R_{D3}$, and $R_{D4}$ are suitably configured to set the output impedance of equalizer circuit 700 to provide a good match to drive a controlled impedance transmission channel. In accordance with an exemplary embodiment, the output impedances are configured to be approximately between 25 ohms and 75 ohms, but can also be configured with lower or higher impendences as well. In addition, degeneration resistors $R_{D1}$, $R_{D2}$, $RD_3$, and $R_{D4}$ are configured to linearize output stage 710 to provide a softer response.

To provide the feedback arrangement, a plurality of small drive inverters can be suitably coupled between output terminals 730 and 732 of output stage 710 and the output of high drive inverters 706 and 708. In accordance with an exemplary embodiment, equalizer circuit 700 is configured with a first pair of small drive inverters 712 and 714 and a second pair of small drive inverters 716 and 718 coupled between output terminals 730 and 732 and drive signals 724 and 726, with differential output signals 730 and 732 being configured to drive small inverters 712, 714, 716, and 718.

Inverters 712, 714, 716, and 718 are suitably configured to restore differential output signals 730 and 732 to full amplitude as well as to provide some delay. Inverters 712 and 714 can suitably sense differential output signals 730 and 732, and provide the sensed signals to inverters 716 and 718. Inverters 716 and 718 are configured to provide the sensed signal to the output of high drive inverters 706 and 708. In accordance with another exemplary embodiment, inverters 716 and 718 can be suitably configured to control the amount of pulse shaping that results from the feedback configuration by providing appropriate scaling of the sensed signal. To facilitate the scaling of the sensed or feedback signal, one or more control signals can be configured to control the operation of inverters 716 and 718 such that the amplitude of the sensed signal may be changed. As such inverters 716 and 718 can facilitate programmable scaling of the pulse shaping functions of pre-emphasis equalization circuit 700.

The output signals of inverters 716 and 718 are current summed with high drive inverters 706 and 708, respectively, with or without scaling, and with the result being an adjustment of the signal level on output signals 724 and 726. Accordingly, the output amplitude of differential output signals 730 and 732 can be configured to mid-scale amplitude.

Pulse shaping can be provided such that as input signals at input terminals 702 and 704 are switched or transitioned, for example from a low state to a high state, a full amplitude signal becomes available at output signals 724 and 726 resulting in a full amplitude output at output signals 730 and 732. The delay within feedback inverters 712, 714, 716, and 718 causes the signal at output signals 724 and 726 to be reduced after a small delay, which causes output signals 730 and 732 to be reduced following a slight delay after a transition of the input signals at input terminals 702 and 704. Accordingly, transitions with a pulse shaped output waveform are suitably emphasized. Similar operation is realized for transitions of the input signal from a high state to a low state, i.e., the delay within feedback inverters 712, 714, 716, and 718 causes the signal at output signals 724 and 726 to be increased after a small delay, which causes output signals 730 and 732 to be increased following a slight delay after a transition of the input signals at input terminals 702 and 704.

Figure 9:
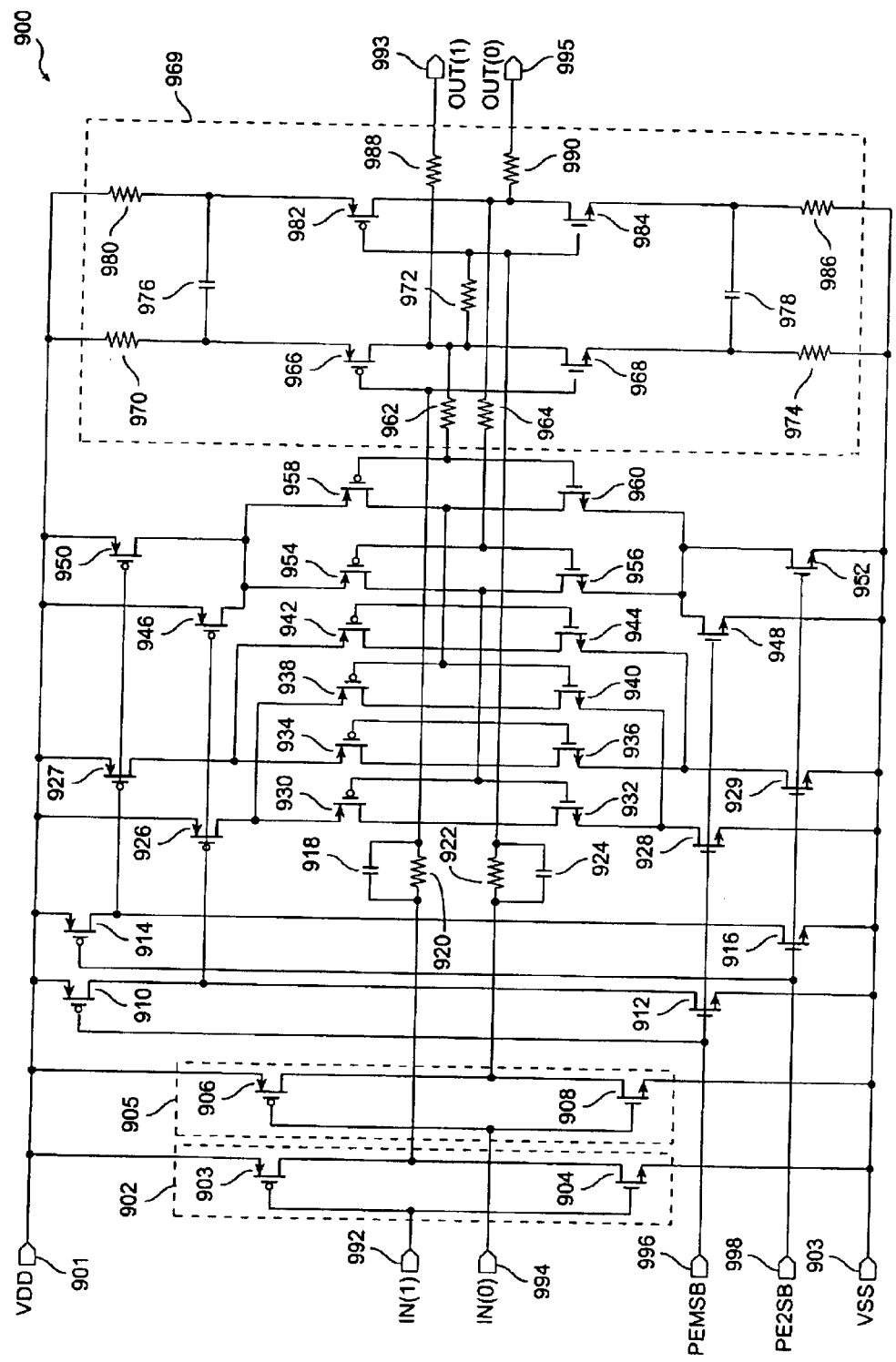
FIG. 9 illustrates a circuit implementation of an exemplary high speed output buffer with programmable pre-emphasis using a feedback architecture.

The various components of pre-emphasis equalizer circuit 700, including high drive inverters 706 and 708, small drive inverters 712, 714, 716 and 718, and output stage 710, can be suitably configured in various manners in accordance with various embodiments of the present invention. For example, with reference to FIG. 9, a more detailed schematic diagram of an exemplary output buffer circuit with programmable pre-emphasis equalization configured with a feedback architecture is illustrated.

Output buffer 900 suitably comprises an input stage including a pair of high drive inverters 902 and 905 and an output stage 969. High drive inverters 902 and 905 are suitably configured to drive output stage 969. High drive inverters 902 and 905 suitably comprise a pair of transistors 903 and 904 and a pair of transistors 906 and 908, respectively. Power supply connections for output buffer 900 can be provided at terminals 901 and 907, e.g., with supply voltage $V_{DD}$ connected to terminal 901 and ground connected to terminal 907. Encoded data, such as a differential rail-to-rail signal, to be transmitted by output buffer 900 can be suitably received at differential input terminals 992 and 994, with differential input terminals 992 and 994 coupled to the gates of transistors 903 and 904 and transistors 906 and 908, respectively.

The output drive signals of high drive inverters 902 and 905 can be suitably coupled through series resistors 920 and 922 to output stage 969. Resistors 920 and 924 are suitably configured to scale the output drive capability of high drive inverters 902 and 905, thus varying the output impedance. The values of resistors 920 and 924 can comprise various values, for example, between approximately 20 and 60 ohms, e.g., a 40 ohm resistance, or any other suitable value for scaling the output drive capability. Further, instead of using scaling resistors 920 and 924, output buffer could directly reduce the strength of inverters 902 and 905 using smaller width transistors. To maintain the fast switching capability of high drive inverters 902 and 905 with a scaled, lower output impedance, output buffer 900 can also comprise a pair of capacitors 918 and 922, configured in parallel with scaling resistors 920 and 924, respectively, and configured to reduce the RC time constant.

Output stage 969 comprises two degenerated inverters configured in a common source push-pull configuration to provide two output buffer signals 993 and 995. A first degenerated inverter comprises transistors 966 and 968 and degeneration resistors 970 and 974, while a second degenerated inverter comprises transistors 982 and 984 and degeneration resistors 980 and 986. Degeneration resistors 982, 984, 980 and 986 are suitably configured to linearize output stage 969 and to set the output impedance at buffered outputs 993 and 995 to provide a good match to drive a controlled impedance transmission channel. In accordance with an exemplary embodiment, the output impedances are configured to be approximately between 25 ohms and 75 ohms, but can also be configured with lower or higher impedances as well. In addition, degeneration resistors 982, 984, 980 and 986 are configured to linearize output stage 969 to provide a softer response.

In addition to the degeneration features above, output stage 969 can also include a resistor 972 coupled between the collectors of transistors 966 and 968 and the collectors of transistors 982 and 984. Resistor 972 is suitably configured to provide some additional loading for further control of the output swing and output impedance at buffered outputs 993 and 995. Resistor 972 can comprise various values for providing loading, for example, an approximate resistance of 400 ohms, or any value less than or greater than 400 ohms for providing loading. Further, one or more additional loading resistors can be provided as well, such as, for example, a load resistor 988, e.g., a small resistance of between 5 and 50 ohms, such as 10 ohms, coupled between the collectors of transistors 966 and 968 and buffered output 993, and a load resistor 990, e.g., a small resistance of between 5 and 50 ohms, coupled between the collectors of transistors 982 and 984 and buffered output 995; however, the two degenerated inverters can also be directly connected to buffered outputs 993 and 995 without the use of additional load resistors 988 and 990. Still further, output stage 969 can also comprise capacitors 976 and 978 to provide some high frequency peaking to improve the transient response of output stage 969. Capacitor 976 is coupled between the sources of transistors 970 and 972, while capacitor 978 is coupled between the sources of transistors 968 and 986.

Output buffer 900 also comprises a feedback arrangement for providing programmable pre-emphasis equalization. In accordance with an exemplary embodiment, output buffer 900 comprises a pair of inverters configured for providing feedback from output stage 969 to the output signals of high drive inverters 902 and 905. A first inverter comprises feedback transistors 954 and 956 while a second inverter comprises feedback transistors 958 and 960 coupled to output stage 969. The first and second feedback inverters are configured for sensing the output signals of output stage 969 and providing a feedback signal summed with the output signals of high drive inverters 902 and 905 to adjust the drive signals for output stage 969. For example, the gates of transistors 954 and 956 can be coupled through a sensing resistor 964 to the collectors of transistors 982 and 984, while the gates of transistors 958 and 960 can be coupled through a sensing resistor 962 to the collectors of transistor 966 and 968, to provide feedback signals that can be used to adjust the drive level at the gate of output transistors 966, 968, 982, and 984. Sensing resistor 962 and 964 can comprise various values for facilitating sensing, for example, an approximate resistance of 400 ohms, or any value less than or greater than 400 ohms for providing sensing of the output signals of output stage 969.

In accordance with the exemplary embodiment, the amount of pulse shaping resulting from the feedback configuration is realized through suitably scaling of the relative weights of the feedback transistors 954, 956, 958 and 960 during the current summing function. In accordance with this embodiment, additional inverters comprising transistors 930 and 932, transistors 934 and 936, transistors 938 and 940, and transistors 942 and 944, can be configured as scaleable feedback paths to be selectably chosen to provide the appropriate pulse shaping to accommodate the expected attenuation of the transmission channel. In the exemplary embodiment, transistors 930, 934, 938 and 942 comprise PFET devices, while transistors 932, 936, 940 and 944 comprise NFET devices.

The amount of feedback signal provided from feedback transistors 954, 956, 958 and 960 is selectable using a plurality of switches, for example switches 926, 927, 946, 950, 928, 929, 948, and 952. During operation, switches 926, 927, 946, 950, 928, 929, 948, and 952 are configured to turn off some or all of the feedback paths created by the additional inverters comprising transistors 930 and 932, transistors 934 and 936, transistors 938 and 940, and transistors 942 and 944, such that various combinations of control inputs 996 and 998 result in different pre-emphasis equalization settings. In accordance with the exemplary embodiment, switches 926, 927, 946, 950 comprise PFET devices, while switches 928, 929, 948, and 952 comprise NFET devices.

Control inputs 996 and 998 are suitably configured for enabling NFET switches 928, 929, 948, and 952 through coupling to the gates of each device. For interfacing control inputs 996 and 998 to PFET switches 926, 927, 946 and 950, in accordance with the exemplary embodiment, output buffer 900 can include an additional pair of inverters comprising transistors 910 and 912 and transistors 914 and 916 which are configured to generate complementary control signals to that of control inputs 996 and 998. However, output buffer 900 could also include additional control inputs configured to enable PFET switches 926, 927, 946 and 950 to control the amount of pulse shaping.

In accordance with an exemplary embodiment, the relative sizes of the additional inverters can be suitably configured to facilitate further enhancement of the pulse shaping functions. For example, the inverters comprising transistors 930 and 932 and transistors 938 and 940 can be two times the size of the inverters comprising transistors 934 and 936, and transistors 942 and 944. With four control signal states for input controls 196 and 198, e.g., 0,0; 0,1; 1,0; and 1,1, four different feedback configurations could be realized, with each configuration having a different strength in providing the feedback signal for the current summing with the drive signals of the input stage. Moreover, other ratios of sizes and strengths could be provided for the inverters comprising transistors 934 and 936, and transistors 942 and 944, to suitably scale the pulse shaping functions of output buffer 900.

As a result of the scaled output signals of inverters comprising transistors 930 and 932, transistors 934 and 936, transistors 938 and 940, and 942 and 944, i.e., the signals from the respective drains, being current summed with high drive inverters 902 and 905, an adjustment of the signal level on the drive signals to the two degenerated inverters of output stage 969. Thus, the output amplitude of differential output signals 993 and 995 can be configured towards a mid-scale amplitude from a full scale amplitude, resulting in pulse shaping of differential output signals 993 and 995. Accordingly, transitions at differential input terminals 992 and 994 result in a pulse shaped output waveform at differential output signals 993 and 995.

Figure 16:
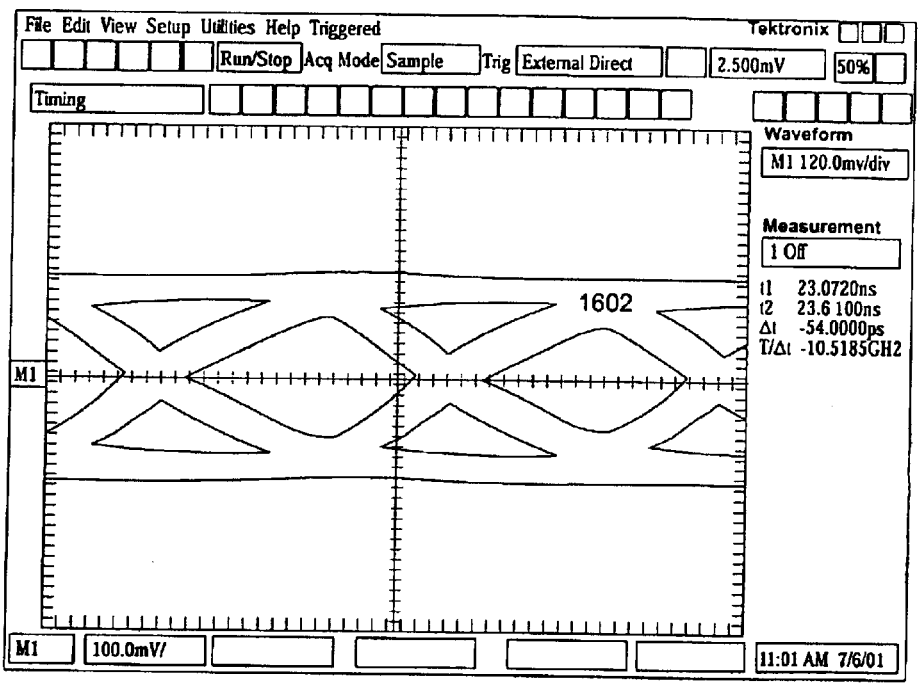
FIG. 16 illustrates the measured data eye at the end of a transmission channel resulting from operation of an exemplary high speed output buffer with pre-emphasis equalization enabled to an exemplary optimum setting.

Improvements to the measured data eye during operation of output buffer 900 can be realized with reference to FIGS. 12 through 16. With the pre-emphasis disabled, and with reference to FIG. 12, a data eye 1202 corresponding to a 2.5 Gbps waveform at the output of buffer 900 for a PCB trace, and with reference to FIG. 13, a data eye 1302 corresponding to a 2.5 Gbps waveform received at the end of a representative transmission channel for a PCB trace, e.g., a PCB trace approximately 35 inches in length, are illustrated. However, with the pre-emphasis enabled, with reference to FIG. 14, a data eye 1402 corresponding to a 2.5 Gbps waveform at the output of buffer 900 for a PCB trace at a minimum pre-emphasis setting, and with reference to FIG. 15, a data eye 1502 corresponding to a 2.5 Gbps waveform at the output of buffer 900 for a PCB trace at a maximum pre-emphasis setting, are illustrated which demonstrate significant improvement. Further, with the pre-emphasis enabled to its optimum setting as illustrated in FIG. 16, a data eye 1602 corresponding to a 2.5 Gbps waveform received at the end of a representative transmission channel corresponding to a PCB trace, e.g., a PCB trace approximately 35 inches in length, is illustrated which further demonstrates the results through operation of output buffer 900 with pre-emphasis equalization.

Figure 8:
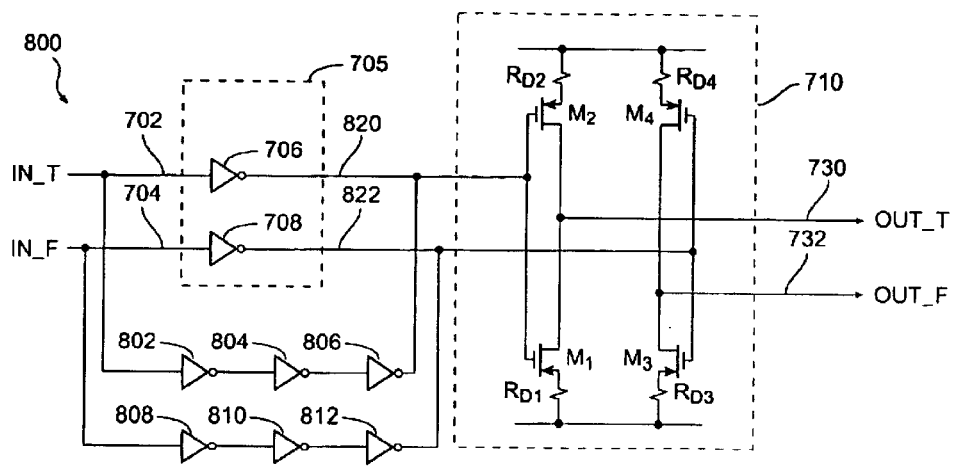
FIG. 8 illustrates a block diagram of an exemplary output buffer incorporating a pre-emphasis equalizer using a feedforward architecture.

While exemplary pre-emphasis equalizer circuit 700 can be configured with a feedback arrangement configured for pulse shaping functions, in accordance with another exemplary embodiment of the present invention, an exemplary pre-emphasis equalizer circuit can also be suitably configured with a feedforward configuration for providing pulse shaping functions. For example, with reference to FIG. 8, an exemplary pre-emphasis equalizer circuit 800 is illustrated that does not require a clock input or additional tapped delay stages. Pre-emphasis equalizer circuit 800 is configured such that pulse shaping can be realized through the use of a feedforward circuit.

To provide the feedforward arrangement, a plurality of small drive inverters can be suitably coupled between input terminals 702 and 704 of high drive inverters 706 and 708 and the outputs 820 and 822 of high drive inverters 706 and 708. In accordance with an exemplary embodiment, equalizer circuit 800 is configured with three small drive inverters 802, 804 and 806 coupled between input terminal 702 and output signal 820 and three small drive inverters 808, 810 and 812 coupled between input terminal 704 and output signal 822, with the differential input signals at input terminals 702 and 704 driving small inverters 802, 804, 806, 808, 810 and 812.

Inverters 802, 804, 806, 808, 810 and 812 are suitably configured to provide some delay relative to high drive inverters 706 and 708. Inverters 802 and 808 are configured to sense the input signal at input terminals 702 and 704, and then provide a feedforward signal that may be suitably scaled by inverters 804 and 810 and inverters 806 and 812. Inverters 806 and 812 are current summed with high drive inverters 706 and 708, respectively, with the result being an adjustment of the signal level on output signals 820 and 822 to bring to a mid-scale level, thus resulting in the output amplitude of differential output signals 730 and 732 being configured towards a mid-scale amplitude.

Pulse shaping can be provided such that as input signals at input terminals 702 and 704 are switched or transitioned, e.g., from a low state to a high state, a full amplitude signal becomes available at output signals 820 and 822 resulting in a full amplitude output at output signals 730 and 732. The delay within inverters 802, 804, 806, 808, 810 and 812 causes the signal at output signals 820 and 822 to be reduced after a small delay, which causes output signals 730 and 732 to be reduced following a slight delay after a transition. Accordingly, transitions with a pulse shaped output waveform are suitably emphasized. Similar operations are realized for transistions from a high state to a low state, e.g., the delay within inverters 802, 804, 806, 808, 810 and 812 causes the signal at output signals 820 and 822 to be increased after a small delay, which causes output signals 730 and 732 to be increased following a slight delay after a transition.

Pre-emphasis equalization circuit 800 can also be configured in various manners with a feedforward architecture for providing programmable pulse shaping functions during pre-emphasis equalization. For example, with reference to FIG. 10, a high speed output buffer 1000 with programmable pre-emphasis equalization using a feedforward architecture is illustrated.

Output buffer 1000 suitably includes a pair of high drive inverters 1003 and 1005 and an output stage 1017. Power supply connections for output buffer 1000 can be provided at terminals 1096 and 1097, e.g., with supply voltage $V_{DD}$ connected to terminal 1096 and ground connected to terminal 1097. High drive inverters 1003 and 1005 are configured to create differential drive signals 1014 and 1016 to drive output stage 1017, e.g., the collectors of transistors 1006 and 1008 and transistors 1010 and 1012 are configured to drive differential signals 1014 and 1016, respectively. High drive inverters 1003 and 1005 suitably comprise a pair of transistors 1006 and 1008 and a pair of transistors 1010 and 1012, respectively. Encoded data to be transmitted by output buffer 1000 can be suitably received at differential input terminals 1002 and 1004, with differential input terminals 1002 and 1004 coupled to the gates of transistors 1006 and 1008 and transistors 1010 and 1012, respectively.

Output stage 1017 comprises two degenerated inverters configured to provide two output buffer signals 1025 and 1027. A first degenerated inverter comprises transistors 1018 and 1020 and degeneration resistors 1026 and 1028, while a second degenerated inverter comprises transistors 1022 and 1024 and degeneration resistors 1030 and 1032. Degeneration resistors 1026, 1028, 1030, and 1032 are suitably configured to set the output impedance at buffered outputs 1025 and 1027 to provide a good match to drive a controlled impedance transmission channel, and can comprise resistance values similar to that of degeneration resistors 970, 974, 980 and 986, above.

In addition to the degeneration features above, output stage 1017 can also include a resistor 1023 coupled between the collectors of transistors 1018 and 1020 and the collectors of transistors 1022 and 1024. Resistor 1023 is suitably configured to provide some additional loading for further control of the output swing and output impedance, and can comprise various resistance values for providing loading. Further, output stage 1017 can also comprise capacitors 1034 and 1036 to provide some high frequency peaking to improve the transient response of output stage 1017. Capacitor 1034 is coupled between the sources of transistors 1018 and 1022, while capacitor 1036 is coupled between the sources of transistors 1020 and 1024. Accordingly, output stage 1017 is suitably configured in a common source push-pull configuration.

Output buffer 1000 also comprises a feedforward arrangement for facilitating pre-emphasis equalization. In accordance with the exemplary embodiment, the differential inputs signals received at input terminals 1002 and 1004 can also be used to drive a plurality of small inverters configured in a feedforward arrangement. For example, the differential inputs signals received at input terminals 1002 and 1004 can be used to drive a first stage of feedforward inverters comprising a first small inverter 1007 and a second small inverter 1009. In accordance with the exemplary embodiment, first small inverter 1007 comprises transistors 1038 and 1040, while second small inverter 1009 comprises transistors 1042 and 1044. The first stage of feedforward inverters 1007 and 1009 can be configured to sense the differential input signals at input terminals 1002 and 1004. The outputs of small inverters 1007 and 1009 can be delayed by coupling series resistors 1046 and 1048 to the collectors of transistors 1038 and 1040 and the collectors of transistors 1042 and 1044. Series resistors 1046 and 1048 can also be configured to enable small inverters 1007 and 1009 to drive a second stage of feedforward inverters 1049 and 1051 comprising transistors 1050 and 1052 and transistors 1054 and 1056, respectively.

Second stage of inverters 1049 and 1051 are configured to provide some additional delay and to drive a third inverter stage comprising a pair of transistors 1058 and 1060 and a pair of transistors 1062 and 1064. In accordance with other exemplary embodiments, first stage of inverters 1007 and 1009 can be directly coupled to the third inverter stage. The third inverter stage comprising transistors 1058 and 1060 and transistors 1062 and 1064 can be suitably summed to high drive inverters 1006 and 1008 and 1010 and 1012. In accordance with an exemplary embodiment, the third inverter stage can also provide additional delay relative to high drive inverters 1003 and 1005 and can be current summed to high drive inverters 1006 and 1008 and 1010 and 1012 through a plurality of series switches, such as switches 1066, 1068, 1070, 1072, 1074, 1076, 1078, 1080, 1082, 1084, 1086, and 1088. The third stage of inverters comprising transistors 1058 and 1060 and transistors 1062 and 1064 are configured to provide some delay relative to high drive inverters 1003 and 1005 such that the current summation weakens the signal level on drive signals 1014 and 1016. Accordingly, the output voltage at output terminals 1025 and 1027 can be suitably pulse shaped by reducing their amplitude after a slight delay from the transition.

In accordance with an exemplary embodiment, the amount of pulse shaping can be varied by changing the relative weight of the current summing function. In accordance with this embodiment, a plurality of input controls can be configured to change the effective output resistance of the third stage of inverters 1057 and 1061 through control of the plurality of series switches 1066, 1068, 1070, 1072, 1074, 1076, 1078, 1080, 1082, 1084, 1086, and 1088. For example, input controls 1090, 1091, and 1092, and their complementary input controls 1093, 1094, and 1095, can be suitably coupled to the gates of the plurality of series switches, e.g., input control 1090 is coupled to the gates of switches 1070 and 1082, input control 1091 is coupled to the gates of switches 1068 and 1080, input control 1092 is coupled to the gates of switches 1066 and 1078, while complement input control 1093 is coupled to the gates of switches 1072 and 1084, input control 1094 is coupled to the gates of switches 1074 and 1086, and input control 1095 is coupled to the gates of switches 1076 and 1088. This control of input controls 1090–1095 is configured to effectively change the weight of third stage of inverters 1057 and 1061 in the current summation and change the amount of pre-emphasis equalization in output buffer 1000. The selection of input controls 1090–1095 is based on the expected or predicted attenuation in the transmission channel, and may be changed or reprogrammed for different transmission channels.

Figure 11:
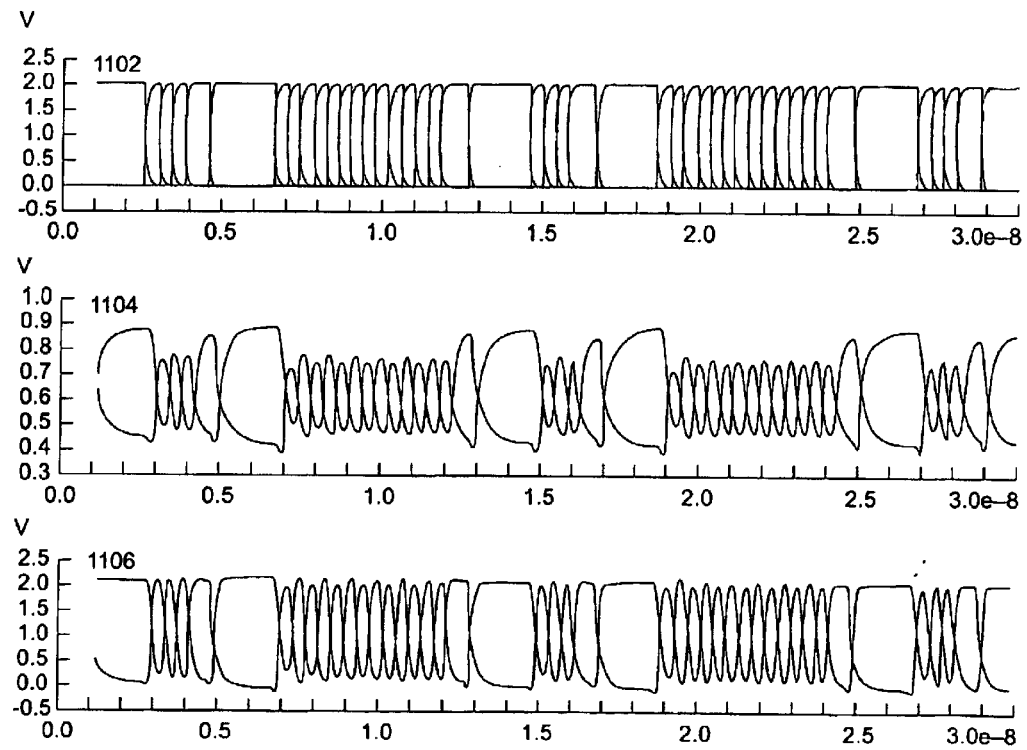
FIG. 11 illustrates a simulated waveform of an exemplary high speed output buffer.
Figure 10:
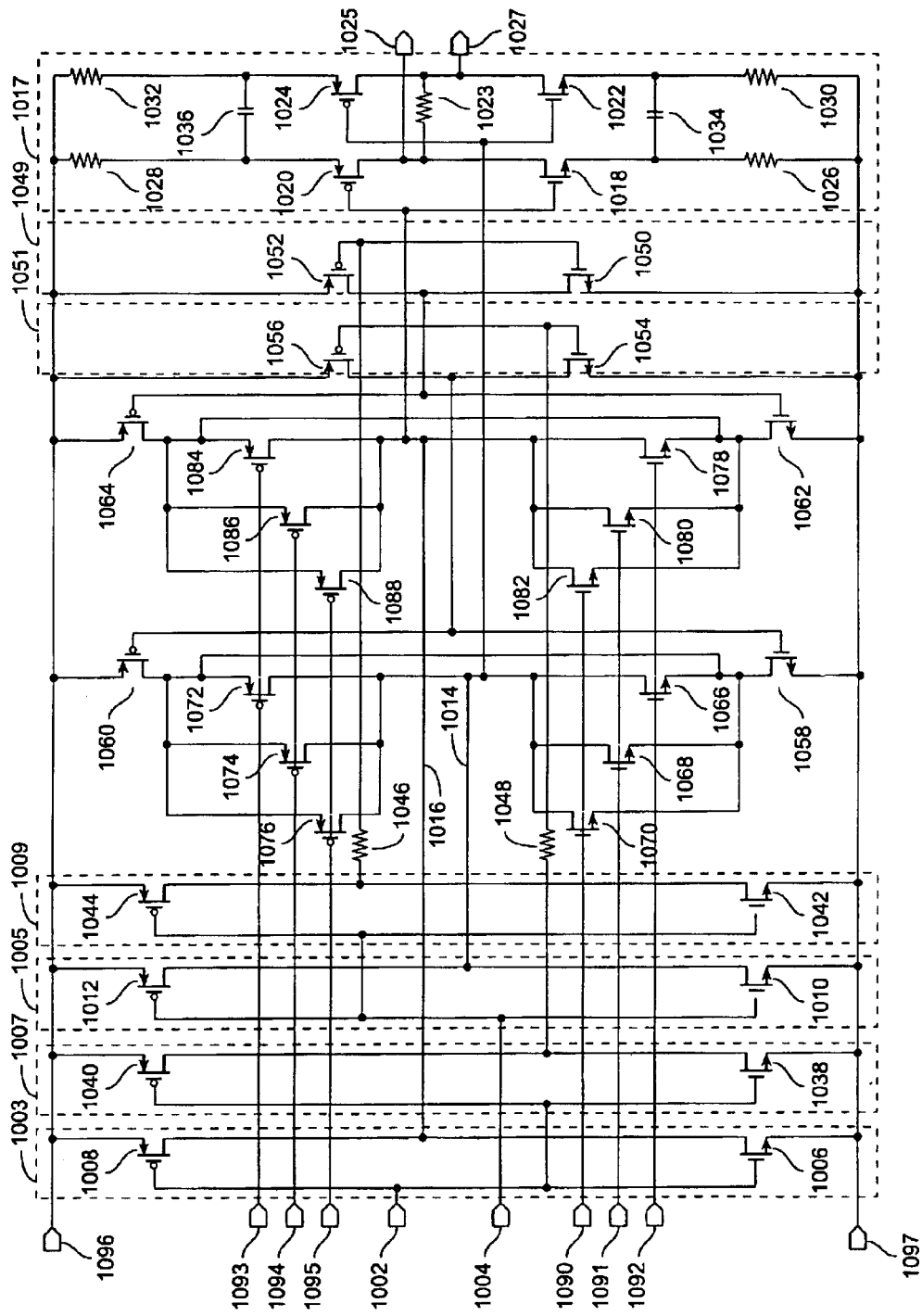
FIG. 10 illustrates a circuit implementation of an exemplary high speed output buffer with programmable pre-emphasis using a feedforward architecture.
Figure 12:
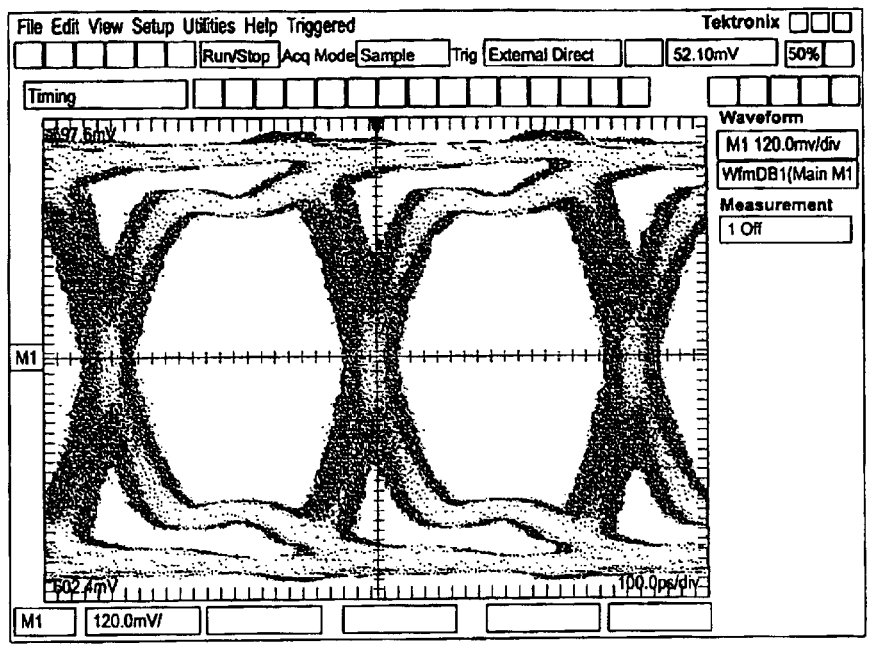
FIG. 12 illustrates a measured data eye at the output of an exemplary high speed output buffer with pre-emphasis equalization disabled.
Figure 13:
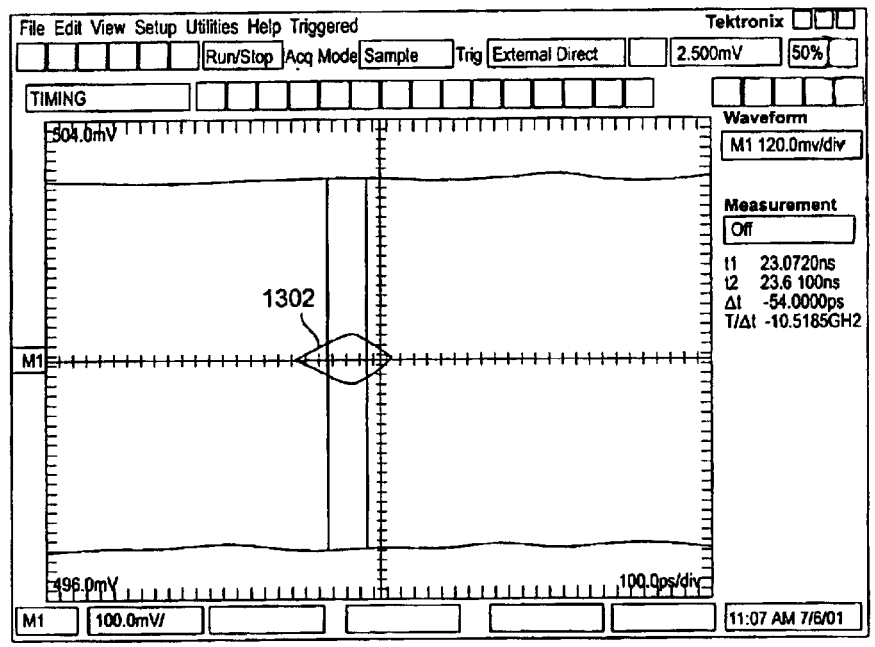
FIG. 13 illustrates a measured data eye at the end of a transmission channel resulting from operation of an exemplary high speed output buffer with pre-emphasis equalization disabled.
Figure 14:
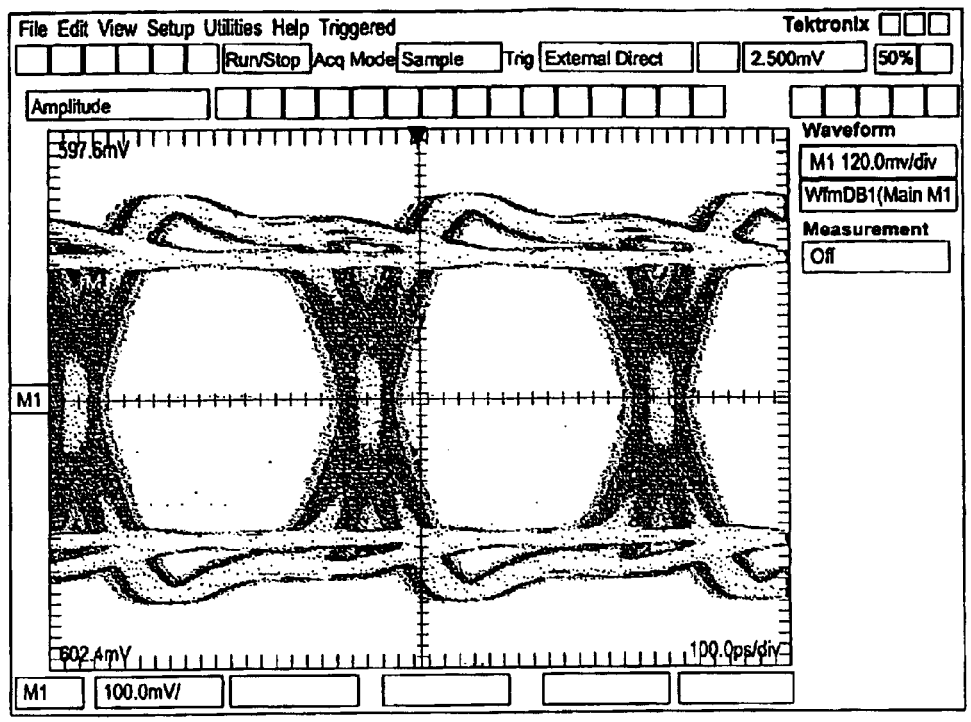
FIG. 14 illustrates a measured data eye at the output of an exemplary high speed output buffer with pre-emphasis equalization enabled to a minimum pre-emphasis setting.
Figure 15:
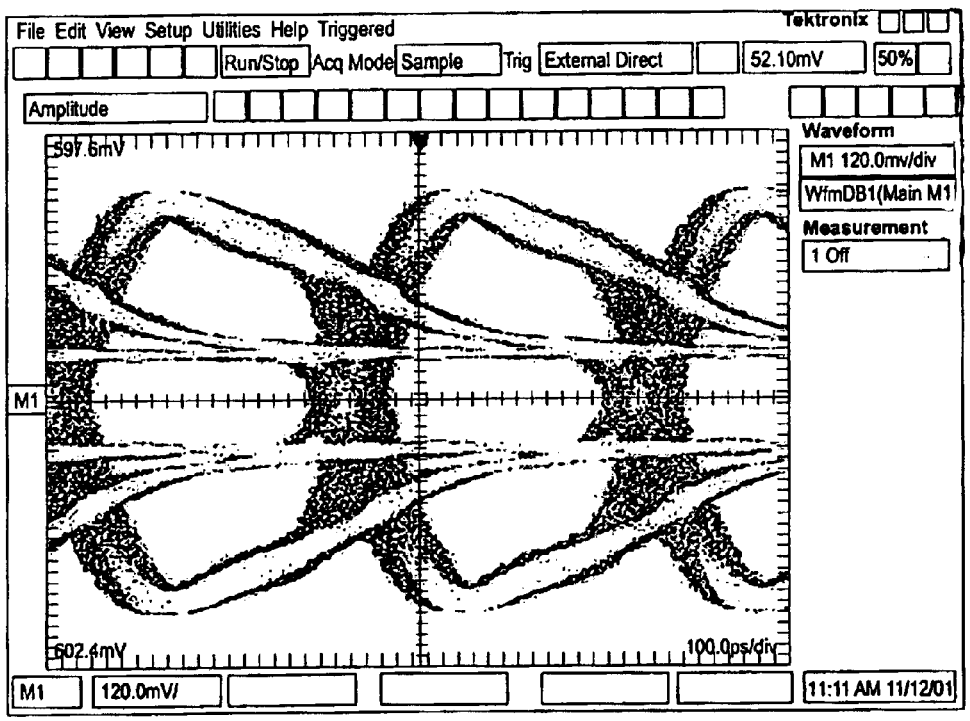
FIG. 15 illustrates a measured data eye at the output of an exemplary high speed output buffer with pre-emphasis equalization enabled to a maximum pre-emphasis setting.

With reference to FIG. 11, simulated waveforms for operation of an output buffer 1000 of FIG. 10 is illustrated. A top waveform 1102 illustrates the true and complement input signals to output buffer 1000, i.e., the differential input signal at input terminals 1002 and 1004. With the pre-emphasis disabled, a middle waveform 1104 illustrates the waveform received at the end of a representative transmission channel corresponding to a PCB trace approximately 24 inches in length. However, with the pre-emphasis enabled to the optimum setting, a bottom waveform illustrates the waveform received at the end of a representative transmission channel corresponding to the PCB trace approximately 24 inches in length. As can be realized, the amplitude of the input signals are favorably pulse shaped by output buffer 1000 based on the transmission channel length, medium and the like.

The present invention has been described above with reference to various exemplary embodiments. However, those skilled in the art will recognize that changes and modifications may be made to the exemplary embodiments without departing from the scope of the present invention. The various components may be implemented in alternate ways, such as, for example, by implementing additional scaling switches, inverters, loading resistors and the like. For example, for a feedback configuration, additional control input signals can be provided to additional inverters, such as three control input signals and three feedback inverter stages, such that eight different strength levels of pulse shaping functions could be realized. In addition, for a feedforward configuration, additional or fewer stages could be provided. These alternatives can be suitably selected depending upon the particular application or in consideration of any number of factors associated with the operation of the system. Moreover, these and other changes or modifications are intended to be included within the scope of the present invention, as set forth in the following claims.

What is claimed is:

1. An output buffer configured for providing pre-emphasis equalization to a data communication system, said output buffer comprising: an input stage comprising a pair of input inverters configured for receiving a differential input signal and for providing drive signals;

an output stage comprising a pair of degenerated inverters coupled to said pair of input inverters to receive said drive signals, said pair of degenerated inverters being configured for driving a differential output signal; and a pulse shaping circuit coupled to said output stage and said input stage, comprising at least one pair of inverters, said pulse shaping circuit being configured to provide pulse shaping of said differential output signal; and wherein said output buffer is configured to provide a full amplitude signal for said drive signals and said differential output signal after a transition of said differential input signal, and said pulse shaping circuit is configured to provide a mid-scale signal to said output stage after a delay from said transition such, that pulse shaping of said differential output signal occurs.

2. The output buffer according to claim 1, wherein said pulse shaping circuit comprises a feedback configuration, said feedback configuration being configured to sense said differential output signal and to provide through a feedback path to provide current summing to said drive signals to provide said mid-scale signal.

3. The output buffer according to claim 1, wherein said pulse shaping circuit comprises a feedforward configuration, said feedforward configuration being configured to sense said differential input signal and to provide through a feedforward path to provide current summing to said drive signals to provide said mid-scale signal.

4. The output buffer according to claim 1, wherein said pulse shaping circuit comprising a first pair of pulse shaping inverters and a second pair of pulse shaping inverters, said first pair of pulse shaping inverters are configured to drive said second pair of pulse shaping inverters, and said second pair of pulse shaping inverters being selectably operated to provide current summing such that programmable pulse shaping functions are realized within said output buffer.

5. The output buffer according to claim 2, wherein said output buffer further comprises:

a pair of resistors coupled in series between said pair of input inverters and said pair of degenerated inverters and configured to scale output drive capability of said pair of input inverters by reducing output impedance of said pair of input inverters.

6. The output buffer according to claim 5, wherein said output buffer further comprises:

a pair of capacitors, one of said pair of capacitors connected in parallel with one of said pair of resistors, and another of said pair of capacitors connected in parallel with another of said pair of resistors, said pair of capacitors being configured to facilitate increased switching capabilities of said pair of input inverters.

7. The output buffer according to claim 2, wherein said feedback configuration comprises a first feedback inverter and a second feedback inverter, said first feedback inverter and said second feedback inverter configured for sensing said differential output signal to facilitate current summing with said drive signals.

8. The output buffer according to claim 7, wherein said feedback configuration further comprises a pair of sensing resistors for coupling said first feedback inverter and said second feedback inverter to said differential output signals.

9. The output buffer according to claim 7, wherein said feedback configuration further comprises at least two pairs of scaling inverters, with one pair of said scaling inverters coupled to said first feedback inverter, and with another pair of said scaling inverters coupled to said second feedback inverter, said scaling inverters being configured to scale relative weights of feedback signals from said first feedback inverter and said second feedback inverter to provide programmable pre-emphasis equalization of said output buffer.

10. The output buffer according to claim 9, wherein said feedback configuration further comprises a plurality of switches configured for selectively operating said at least two pair of scaling inverters to result in different pre-emphasis equalization settings for pulse shaping.

11. The output buffer according to claim 3, wherein said feedforward configuration further comprises:

a first stage of feedforward inverters coupled to said differential input signal for sensing said differential input signal and configured to provide some delay relative to said pair of input inverters.

12. The output buffer according to claim 11, wherein said feedforward configuration further comprises:

a second stage of feedforward inverters coupled to said first stage of feedforward inverters and configured to provide some additional delay relative to said pair of input inverters.

13. The output buffer according to claim 12, wherein said feedforward configuration further comprises:

a pair of resistors coupled between said second stage of feedforward inverters and said first stage of feedforward inverters.

14. The output buffer according to claim 12, wherein said feedforward configuration further comprises:

a third stage of feedforward inverters coupled to said second stage of feedforward inverters and configured to provide current summing to said drive signals.

15. The output buffer according to claim 14, wherein said feedforward configuration further comprises:

a plurality of series switches coupled between said third stage of feedforward inverters and said drive signals, said plurality of series switches configured to provide a programmable output buffer by facilitating changing of an effective output resistance of said third stage of feedforward inverters to result in different pre-emphasis equalization settings during pulse shaping of said differential output signals.

16. A data communication system for transmitting data signals from a transmitter through a transmission channel to a receiver, said transmitter comprising:

an encoder/serializer for receiving said data signals and for generating encoded data signals; and a pre-emphasis equalized buffer coupled to said encoder/serializer, said pre-emphasis equalized buffer comprising:

an input stage comprising a pair of input inverters configured for receiving said encoded data signals and for providing drive signals;

an output stage comprising a pair of degenerated inverters configured to receive said drive signals, said pair of degenerated inverters also being configured for driving a differential output signal through said transmission channel; and a pulse shaping circuit comprising at least one pair of inverters, said pulse shaping circuit being configured to provide pulse shaping of said differential output signal; and wherein said pre-emphasis equalized buffer is configured to provide a full amplitude signal for said drive signals and said differential output signal after a transition of said encoded data signals, and said pulse shaping circuit is configured to provide a mid-scale signal to said output stage after a delay from said transition such that pulse shaping of said differential output signal occurs.

17. The data communication system according to claim 16, wherein said pulse shaping circuit comprises a feedback configuration, said feedback configuration being configured to sense said differential output signal and to provide through a feedback path to provide current summing to said drive signals to provide said mid-scale signal.

18. The data communication system according to claim 16, wherein said pulse shaping circuit comprises a feedforward configuration, said feedforward configuration being configured to sense said differential input signal and to provide through a feedforward path to provide current summing to said drive signals to provide said mid-scale signal.

19. The data communication system according to claim 16, wherein said pulse shaping circuit comprises a first pair of pulse shaping inverters and a second pair of pulse shaping inverters, said first pair of pulse shaping inverters are configured to drive said second pair of pulse shaping inverters, and said second pair of pulse shaping inverters being selectably operated to provide current summing such that programmable pulse shaping functions are realized within said output buffer.

20. The data communication system according to claim 17, wherein said feedback configuration comprises:

a first feedback inverter and a second feedback inverter, said first feedback inverter and said second feedback inverter configured for sensing said differential output signal to facilitate current summing with said drive signals;

a pair of sensing resistors for coupling said first feedback inverter and said second feedback inverter to said differential output signals; and at least two pairs of scaling inverters, with one pair of said scaling inverters coupled to said first feedback inverter, and with another pair of said scaling inverters coupled to said second feedback inverter, said scaling inverters being configured to scale relative weights of feedback signals from said first feedback inverter and said second feedback inverter to provide programmable pre-emphasis equalization.

21. The data communication system according to claim 20, wherein said feedback configuration further comprises a plurality of switches configured for selectively operating said at least two pair of scaling inverters to result in different pre-emphasis equalization settings during pulse shaping.

22. The data communication system according to claim 18, wherein said feedforward configuration further comprises:

a first stage of feedforward inverters coupled to said differential input signal for sensing said encoded data signals and configured to provide some delay relative to said pair of input inverters;

a second stage of feedforward inverters coupled to said first stage of feedforward inverters and configured to provide some additional delay relative to said pair of input inverters;

a pair of resistors coupled between said second stage of feedforward inverters and said first stage of feedforward inverters; and a third stage of feedforward inverters coupled to said second stage of feedforward inverters and configured to provide current summing to said drive signals.

23. The data communication system according to claim 22, wherein said feedforward configuration further comprises:

a plurality of series switches coupled between said third stage of feedforward inverters and said drive signals, said plurality of series switches configured to provide programmability by facilitating change of an effective output resistance of said third stage of feedforward inverters to result in different pre-emphasis equalization settings during pulse shaping of said differential output signals.

24. A pre-emphasis equalization buffer for use in a data communication system for transmitting data signals from a transmitter through a transmission channel to a receiver, said pre-emphasis equalization buffer comprising:

an input stage comprising a pair of input inverters configured for receiving a differential input signal and for providing drive signals at a pair of output terminals;

an output stage comprising a pair of output inverters coupled to said output of said pair of input inverters to receive said drive signals, said pair of output inverters being configured for driving a differential output signal; and an equalization circuit comprising at least two pairs of inverters, said equalization circuit being configured to provide a full amplitude signal for said differential output signal after a transition of said differential input signal, and to provide current summing to said pair of output terminals to adjust said drive signals provided to said output stage after a delay from said transition such that pulse shaping of said differential output signal occurs.

25. The pre-emphasis equalization buffer according to claim 24, wherein said equalization circuit further comprises a feedback configuration, said feedback configuration being configured to sense said differential output signal and to provide a sensed signal through a feedback path to facilitate current summing to said pair of output terminals of said input stage to provide pulse shaping.

26. The pre-emphasis equalization buffer according to claim 24, wherein said equalization circuit further comprises a feedforward configuration, said feedforward configuration being configured to sense said differential input signal and to provide through a feedforward path to facilitate current summing to said pair of output terminals of said input stage to provide pulse shaping.

27. A method for programmable pre-emphasis equalization of a data communication network, said method comprising the steps of:
providing a differential input signal to an input stage of an output buffer configured for transmission of a differential output signal through a transmission channel;
providing a drive signal from said input stage to an output stage of said output buffer upon transition of said differential input signal from a first state to a second state, said drive signal having an amplitude corresponding to said second state;
current summing a sensed signal with said drive signal after a delay from said transition to provide a mid-scale signal to said output stage, wherein said mid-scale signal facilitates pulse shaping functions during equalization of said data communication network.

28. The method according to claim 27, wherein said step of current summing further comprises:
sensing said differential output signal and providing said sensed signal through a feedback path to facilitate current summing to said drive signal to provide said mid-scale signal.

29. The method according to claim 27, wherein said step of current summing further comprises:
sensing said differential input signal and providing said sensed signal through a feedforward path to facilitate current summing to said drive signal to provide said mid-scale signal.

30. The method according to claim 27, wherein said step of current summing further comprises:
sensing said sensed signal in a first pair of pulse shaping inverters to drive a second pair of pulse shaping inverters being selectably operated to provide current summing such that programmable pulse shaping functions are realized within said output buffer.

31. An output buffer for pre-emphasis equalization in a data communication system, said output buffer comprising:
a pair of input inverters configured for receiving a differential input signal and for providing drive signals;
a pair of output inverters coupled to said pair of input inverters to receive said drive signals, said pair of output inverters being configured for driving a differential output signal; and
an pulse shaping circuit being configured to provide a full amplitude signal for said differential output signal, said pulse shaping circuit comprising at least two pairs of inverters being configured in one of:
a feedback configuration configured to sense said differential output signal and to provide a sensed signal through a feedback path; and
a feedforward configuration configured to sense said differential input signal and to provide a sensed signal through a feedforward path;
said pulse shaping circuit being further configured to provide current summing to said drive signals to adjust said drive signals provided to said pair of output inverters such that pulse shaping of said differential output signal occurs.

32. The output buffer according to claim 31 wherein said pulse shaping circuit is configured to provide said full amplitude signal for said differential output signal after a transition of said differential output signal, and to provide current summing to said drive signals after a delay from said transition.

33. The output buffer according to claim 31, wherein said feedback configuration comprises a first feedback inverter and a second feedback inverter, said first feedback inverter and said second feedback inverter configured for sensing said differential output signal to facilitate current summing with said drive signals.

34. The output buffer according to claim 33, wherein said feedback configuration further comprises a pair of sensing resistors for coupling said first feedback inverter and said second feedback inverter to said differential output signals.

35. The output buffer according to claim 33, wherein said feedback configuration further comprises at least two pairs of scaling inverters, with one pair of said scaling inverters coupled to said first feedback inverter, and with another pair of said scaling inverters coupled to said second feedback inverter, said scaling inverters being configured to scale relative weights of feedback signals from said first feedback inverter and said second feedback inverter to provide programmable pre-emphasis equalization of said output buffer.

36. The output buffer according to claim 35, wherein said feedback configuration further comprises a plurality of switches configured for selectively operating said at least two pair of scaling inverters to result in different pre-emphasis equalization settings for pulse shaping.

37. The output buffer according to claim 31, wherein said feedforward configuration further comprises:
a first stage of feedforward inverters coupled to said differential input signal for sensing said differential input signal and configured to provide some delay relative to said pair of input inverters.

38. The output buffer according to claim 37, wherein said feedforward configuration further comprises:
a second stage of feedforward inverters coupled to said first stage of feedforward inverters and configured to provide some additional delay relative to said pair of input inverters.

39. The output buffer according to claim 38, wherein said feedforward configuration further comprises:
a pair of resistors coupled between said second stage of feedforward inverters and said first stage of feedforward inverters.

40. The output buffer according to claim 38, wherein said feedforward configuration further comprises:
a third stage of feedforward inverters coupled to said second stage of feedforward inverters and configured to provide current summing to said drive signals.

41. The output buffer according to claim 40, wherein said feedforward configuration further comprises:
a plurality of series switches coupled between said third stage of feedforward inverters and said drive signals, said plurality of series switches configured to provide a programmable output buffer by facilitating changing of an effective output resistance of said third stage of feedforward inverters to result in different pre-emphasis equalization settings during pulse shaping of said differential output signals.

* * * * *